United States Patent [19]

Kanemura et al.

[11] Patent Number: 5,059,673

[45] Date of Patent: Oct. 22, 1991

[54] RESIN FOR URETHANE LENSES, LENSES COMPRISING THE RESIN, AND A PROCESS FOR PREPARATION OF THE RESIN AND THE LENSES

[75] Inventors: Yoshinobu Kanemura; Katsuyoshi Sasagawa; Masao Imai, all of Yokohama; Toshiyuki Suzuki, Kamakura, all of Japan

[73] Assignee: Mitsui Toatsu Chemicals, Inc., Tokyo, Japan

[21] Appl. No.: 592,372

[22] Filed: Oct. 3, 1990

[30] Foreign Application Priority Data

Oct. 9, 1989 [JP] Japan .................................. 1-262204

[51] Int. Cl.$^5$ ............................................. C08G 18/75
[52] U.S. Cl. .......................................... 528/67; 528/74
[58] Field of Search ..................................... 528/67, 74

[56] References Cited

U.S. PATENT DOCUMENTS 4,151,194  4/1979  Wu et al. ................................ 528/74

*Primary Examiner*—Maurice J. Welsh
*Attorney, Agent, or Firm*—Burns, Doane, Swecker & Mathis

[57] ABSTRACT

A resin for urethane lenses is here disclosed which is obtained by reacting an alicyclic isocyanate compound represented by the formula (I)

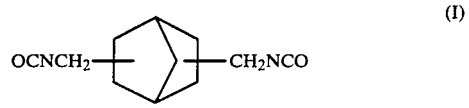

and/or an alicyclic isocyanate compound represented by the formula (II)

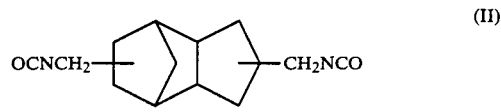

with at least one active hydrogen compound selected from the group consisting of polyol compounds, polythiol compounds except 1,2-bis[(2-mercaptoethyl)thio]-3-mercaptopropane, and thiol compounds having a hydroxyl group. In addition, lenses comprising this resin and processes for the preparation of the resin and the lenses are also disclosed herein.

8 Claims, No Drawings

RESIN FOR URETHANE LENSES, LENSES COMPRISING THE RESIN, AND A PROCESS FOR PREPARATION OF THE RESIN AND THE LENSES

BACKGROUND OF THE INVENTION (i) Field of the Invention

The present invention relates to a resin for urethane lenses having good optical properties and heat resistance, to lenses comprising the resin, and to processes for the preparation of the resin and the lenses.

(ii) Description of the Related Art

Plastic lenses are lighter and less breakable as compared with inorganic lenses, and are also dyeable. Therefore, in recent years, the application of plastic lenses to optical elements such as spectacles and cameras has increased rapidly.

A resin which presently has been widely used for this purpose can be obtained by the radical polymerization of diethylene glycol bis(allylcarbonate) (hereinafter referred to as "D A C"). This kind of resin is characterized by having excellent impact resistance, being lightweight, and having excellent dyeing properties, good workability such as cutting and polishing, and the like.

With regard to this resin, however, its refractive index is lower ($n_D = 1.50$) than that of the inorganic lenses ($n_D = 1.52$). Accordingly, in order to obtain the optical characteristics equal to those of glass lenses, it is necessary to increase the thickness of the center and periphery of the plastic lenses as well as their curvature, so that the thickness of the plastic lenses inevitably increases on the whole. For this reason, the resin for lenses having a higher refractive index is desired.

Furthermore, polyurethane resins are known as resins for lenses having a high refractive index which can be obtained by the reaction of an isocyanate compound and a hydroxy compound such as diethylene glycol (Japanese Patent Laid-open No. 57-136601), the reaction of the isocyanate compound and a hydroxy compound having a halogen atom such as tetrabromobisphenol A (Japanese Patent Laid-open No. 58-164615), and the reaction of the isocyanate compound and a hydroxy compound having a diphenyl sulfide skeleton (Japanese Patent Laid-open No. 60-194401).

Moreover, the same assignee as in this application has already offered, as resins for lenses having a high refractive index, polyurethane resins and lenses comprising the resins obtained by the reaction of an isocyanate compound and a hydroxy compound having a sulfur atom (Japanese Patent Laid-open No. 60-217229) and the reaction of the isocyanate compound and a polythiol compound (Japanese Patent Laid-open Nos. 60-199016, 62-267314 and 63-46213).

The lenses comprising these known resins have a higher refractive index than the lenses using D.A.C, but the degree of its improvement is not sufficient. Additionally, in these resins, compounds having many halogen atoms or an aromatic ring in each molecule thereof are used so as to improve the refractive index, and therefore they have some drawbacks, for example, poor weathering resistance and increased specific gravity.

Moreover, in the plastic lenses offered by the present inventors, the refractive index is still poor; dispersion is more perceptible considering the value of the refractive index as compared with glass lenses; and heat resistance is insufficient in a subsequent step of dyeing, coating and the like. For these reasons, further improvement is demanded.

SUMMARY OF THE INVENTION

An object of the present invention is to provide a resin for urethane lenses having high refractive index, extremely low dispersion, excellent heat resistance and weathering resistance, being lightweight and having good impact resistance.

Another object of the present invention is to provide lenses comprising the above-mentioned resin.

Still another object of the present invention is to provide processes for preparing the above-mentioned resin and lenses.

In order to achieve the aforesaid objects, the present inventors have conducted further research concerning raw materials of a resin for urethane lenses, and as a result, we have found that when an alicyclic isocyanate compound represented by the formula (I)

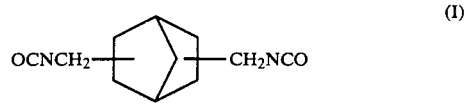

and/or an alicyclic isocyanate compound represented by the formula (II)

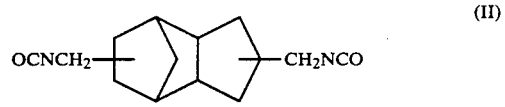

is reacted with at least one active hydrogen compound selected from the group consisting of polyol compounds, polythiol compounds except 1,2-bis[(2-mercaptoethyl)-thio]-3-mercaptopropane, and thiol compounds having a hydroxyl group, a resin for urethane lenses can be obtained which has high refractive index, extremely low dispersion, excellent heat resistance and weathering resistance, and which is lightweight and has good impact resistance. The present invention has been achieved on the basis of this knowledge.

DESCRIPTION OF THE PREFERRED EMBODIMENTS

Typical examples of the alicyclic isocyanate compound represented by the formula (I) used in the present invention include 2,5-bis(isocyanatomethyl)-bicyclo[2.2.1]heptane and 2,6-bis(isocyanatomethyl)bicyclo[2.2.1]heptane, and typical examples of the alicyclic isocyanate compound represented by the formula (II) include 3,8-bis(isocyanatomethyl)tricyclo-[5.2.1.0$^{2.6}$]-decane, 3,9-bis(isocyanatomethyl)tricyclo-[5.2.1.0$^{2.6}$]-decane, 4,8-bis(isocyanatomethyl)tricyclo-[5.2.1.0$^{2.6}$]-decane and 4,9-bis(isocyanatomethyl)tricyclo-[5.2.1.0$^{2.6}$]-decane. These compounds can be used singly or in the form of a mixture of two or more thereof.

Examples of a polyol compound used in the present invention are bifunctional or higher-functional polyols inclusive of compounds having a sulfur atom in each molecule thereof.

Typical examples of the bifunctional or higher-functional polyol compounds include polyols such as ethylene glycol, diethylene glycol, propylene glycol, dipropylene glycol, butylene glycol, neopentyl glycol, glycerin, trimethylolethane, trimethylolpropane, butanetriol, 1,2-methyl glucoside, pentaerythritol, dipentaerythritol, tripentaerythritol, sorbitol, erythritol, slaytol, ribitol, arabinitol, xylitol, allitol, manitol, dulcitol, iditol, glycol, inositol, hexanetriol, triglycerol, diglycerol, triethylene glycol, polyethylene glycol, tris(2-hydroxyethyl)isocyanurate, cyclobutanediol, cyclopentanediol, cyclohexanediol, cycloheptanediol, cyclooctanediol, cyclohexanedimethanol, hydroxypropylcyclohexanol, tricyclo[5.2.1.02.6]decanedimethanol, bicyclo[4.3.0]nonanediol, dicyclohexanediol, tricyclo[5.3.1.1]dodecanediol, bicyclo[4.3.0]nonanedimethanol, tricyclo[5.3.1.1]dodecanediethanol, hydroxypropyltricyclo[5.3.1.1]dodecanol, spiro[3.4]octanediol, butylcyclohexanediol, 1,1-bicyclohexylidenediol, cyclohexanetriol, multitol, lactitol, dihydroxynaphthalene, trihydroxynaphthalene, tetrahydroxynaphthalene, dihydroxybenzene, benzenetriol, biphenyltetraol, pyrogallol, (hydroxynaphthyl)pyrogallol, trihydroxyphenanthrene, bisphenol A, bisphenol F, xylylene glycol, di(2-hydroxyethoxy)benzene, bisphenol A bis-2-hydroxyethyl) ether, tetrabromobisphenol A, tetrabromobisphenol A bis(2-hydroxyethyl) ether, dibromoneopentyl glycol and epoxy resin; condensation reaction products of the above-mentioned polyols and organic polybasic acids such as oxalic acid, glutamic acid, adipic acid, acetic acid, propionic acid, cyclohexanecarboxylic acid, β-oxocyclohexanepropionic acid, dimeric acid, phthalic acid, isophthalic acid, salicylic acid, 3-bromopropionic acid, 2-bromoglycollic acid, dicarboxycyclohexane, pyromellitic acid, butanetetracarboxylic acid and phthalic acid; addition reaction products of the above-mentioned polyols and alkylene oxides such as ethylene oxide and propylene oxide; and addition reaction products of alkylene polyamines and alkylene oxides such as ethylene oxide and propylene oxide.

In addition, their halogen-substituted compounds such as chlorine-substituted compounds and bromine-substituted compounds can also be used.

They can be used singly or in the form of a mixture of two or more thereof.

Examples of the bifunctional or higher-functional polyols having a sulfur atom include bis[4-(2-hydroxyethoxy)phenyl]sulfide, bis[4-(2-hydroxypropoxy)phenyl] sulfide, bis[4-(2,3-dihydroxypropoxy)phenyl] sulfide, bis(4-hydroxycyclohexyl) sulfide, bis[2-methyl-4-(hydroxyethoxy)-6-butylphenyl] sulfide, compounds obtained by adding ethylene oxide and/or propylene oxide to the above-mentioned compounds usually in a ratio of three molecules of the former oxide to one hydroxyl group of each latter compound, di-(2-hydroxyethyl) sulfide, 1,2-bis(2-hydroxyethylmercapto)ethane, bis(2-hydroxyethyl) disulfide, 1,4-dithian-2,5-diol, bis(2,3-dihydroxypropyl) sulfide, tetrakis(4-hydroxy-2-thiabutyl)methane, bis(4-hydroxyphenyl)sulfone (trade name Bisphenol S), tetrabromobisphenol S, tetramethylbisphenol S, 4,4'-thiobis(6-tert-butylphenol) and 1,3-bis(2-hydroxyethylthioethyl)cyclohexane.

In addition, their halogen-substituted compounds such as chlorine-substituted compounds and bromine-substituted compounds can also be used.

They can be used singly or in the form of a mixture of two or more thereof.

Polythiol compounds used in the present invention are bifunctional and higher-functional, and these compounds also include compounds having at least one sulfur atom in addition to a mercapto group. However, 1 2-bis[(2-mercaptoethyl)thio]-3-mercaptopropane is cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, bicyclo[2.2.1]hepta-exo-cis-2,3-dithiol, 1,1-bis(mercaptomethyl)cyclohexane, bis(2-mercaptoethyl) thiomalate, (2-mercaptoethyl) 2,3-dimercaptosuccinate, 2,3-dimercapto-1propanol (2-mercaptoacetate), 2,3-dimercapto-1-propanol (3-mercaptoacetate), diethylene glycol bis(2-mercaptoacetate), diethylene glycol bis(3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl) ether, ethylene glycol bis(2-mercaptoacetate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate) and pentaerythritol tetrakis(3-mercaptopropionate); their halogen-substituted compounds such as chlorine-substituted compounds and bromine-substituted compounds; aromatic polythiols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 1,2,3,4-tetramercaptobenzene, 1,2,3,5-tetramercaptobenzene, 1,2,4,5-tetramercaptobenzene, 1,2,3,4-tetrakis-(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptomethyleneoxy)benzene, 1,2,3,4-tetrakis(mercaptoethyleneoxy)benzene, 1,2,3,5tetrakis(mercaptoethyleneoxy)-benzene, 1,2,4,5-tetrakis-(mercaptoethyleneoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl)propane-2,2-dithiol, 1,3-diphenylpropane-2,2-dithiol, phenylmethane-1,1-dithiol and 2,4-di(p-mercaptophenyl)pentane; halogen-substituted aromatic polythiols such as chlorine-substituted compounds and bromine-substituted compounds, for example, 2,5-dichlorobenzene-1,3-dithiol, 1,3-di(p-chlorophenyl)propane-2,2-dithiol, 3,4,5-tribromo-1,2-dimercaptobenzene and 2,3,4,6-tetrachloro-1,5-bis(mercaptomethyl)benzene; polythiols having a heterocyclic ring such as 2-methylamino-4,6-dithiol-sym-triazine, 2-ethylamino- 4,6-dithiol-sym-triazine, 2-morpholino-4,6-dithiol-sym-triazine, 2-cyclohexylamino-4,6-dithiol-symtriazine, 2-methoxy-4,6-dithiol-sym-triazine, 2-phenoxy-4,6-dithiol-sym-triazine, 2-thiobenzeneoxy-4,6-dithiol-sym-triazine and 2-thiobutyloxy-4,6-dithiol-sym-triazine; and their halogen-substituted compounds such as chlorine-substituted compounds and bromine-substituted compounds.

They can be used singly or in the form of a mixture of two or more thereof.

Examples of the bifunctional and more-functional polythiols having at least one sulfur atom in addition to the mercapto group include aromatic polythiols such as 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene and their nuclear-alkylated compounds; aliphatic polythiols such as bis(mercaptomethyl) sulfide, bis(mercaptoethyl) sulfide, bis(mercaptopropyl) sulfide, bis(mercaptomethylthio)methane, bis(2-mercaptoethylthio)-methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylmethyl)methane, bis(2,3-dimercaptopropyl) sulfide, 2,5-dimercapto-1,4-dithian, bis(mercaptomethyl) disulfide, bis(mercaptoethyl) disulfide, bis(mercaptopropyl) disulfide and their esters of thioglycollic acid and mercaptopropionic acid, hydroxymethylsulfido bis(2-mercaptoacetate), hydroxymethylsulfido bis(3-mercaptopropionate), hydroxyethylsulfido bis(2-mercaptoacetate), hydroxyethylsulfido bis(3-mercaptopropionate), hydroxypropylsulfido bis(2-mercaptoacetate), hydroxypropylsulfido bis(3-mercaptopropionate), hydroxymethyldisuldido bis(2-mercaptoacetate), hydroxymethyldisulfido bis(3-mercaptopropionate), hydroxyethyldisulfido bis(2-mercaptoacetate), hydroxyethyldisulfido bis(3-mercaptopropionate), hydroxypropyldisulfido bis(2-mercaptoacetate), hydroxypropyldisulfido bis(3-mercaptopropionate), 2-mercaptoethyl ether bis(2-mercaptoacetate), 2-mercaptoethyl ether bis(3-mercaptopropionate), 1,4-dithian-2,5-diol bis(2-mercaptoacetate), 1,4-dithian-2,5-diol bis(3-mercaptopropionate), bis(2-mercaptoethyl) thiodiglycolate, bis(2-mercaptoethyl) thiodipropionate, bis(2-mercaptoethyl) 4,4-thiodibutylate, bis(2-mercaptoethyl) dithiodiglycolate, bis(2-mercaptoethyl) dithiodipropionate, bis(2-mercaptoethyl) 4,4-dithiodibutylate, bis(2,3-dimercaptopropyl) thiodiglycolate, bis(2,3-dimercaptopropyl) thiodipropionate, bis(2,3-dimercaptopropyl) dithioglycolate, bis(2,3-dimercaptopropyl) dithiopropionate; and compounds having a heterocyclic ring such as 3,4-thiophenedithiol and bismuthiol Additionally, their halogen-substituted compounds such as chlorine-substituted compounds and bromine-substituted compounds can also be used.

They can be used singly or in the form of a mixture of two or more thereof.

Examples of a thiol compound having a hydroxyl group used in the present invention include compounds having at least one sulfur atom in addition to a mercapto group.

Typical examples of such compounds include 2-mercaptoethanol, 3-mercapto-1,2-propanediol, glycerin di(mercaptoacetate), 1-hydroxy-4-mercaptocyclohexane, 2,4-dimercaptophenol, 2-mercaptohydroquinone, 4-mercaptophenol, 3,4-dimercapto-2-propanol, 1,3-dimercapto-2-propanol, 2,3-dimercapto-1-propanol, 1,2-dimercapto-1,3-butanediol, trimethylolpropane bis(thioglycolate), trimethylolpropane bis(3-mercaptopropionate), trimethylolpropane mono(thioglycolate), trimethylolpropane mono(3-mercaptopropionate), pentaerythritol tris(3-mercaptopropionate), pentaerythritol mono(3-mercaptopropionate), pentaerythritol bis(3-mercaptopropionate), pentaerythritol tris(thioglycolate), dipentaerythritol pentakis(3-mercaptopropionate), hydroxymethyltris(mercaptoethylthiomethyl)methane, 1-hydroxyethylthio-3mercaptoethylthiobenzene, 4-hydroxy-4'-mercaptodiphenylsulfone, 2-(2-mercaptoethylthio)ethanol, dihydroxyethylsulfido mono(3-mercaptopropionate), dimercaptoethane mono(salicylate), hydroxyethylthiomethyl-tris(mercaptoethylthiomethyl)methane.

Additionally, their halogen-substituted compounds such as chlorine-substituted compounds and bromine-substituted compounds can also be used.

They can be used singly or in the form of a mixture of two or more thereof.

A ratio of the alicyclic isocyanate compound represented by the formula (I) and/or the formula (II) to the active hydrogen compound is such that the molar ratio of functional groups represented by NCO/(SH +OH) is usually in the range of from 0.5 to 3.0, preferably from 0.5 to 1.5.

The resins of the present invention are the urethane resin and/or the S-alkyl thiocarbamate resin, and their main chemical linkages are the urethane bond of an isocyanate group and a hydroxyl group and/or a mercapto group, and/or an S-alkyl thiocarbamate bond, but needless to say, other bonds can be additionally contained therein such as an allophanate bond, a urea bond and a biuret bond, depending upon the intended purpose. For example, the urethane bond or the S-alkyl thiocarbamate bond can be further reacted with the isocyanate group so as to increase the crosslink density, which often leads to preferable results. In this case, a reaction temperature is raised up to at least 100° C. and the isocyanate component is used in large quantities. Alternatively, an amine or the like can be partially used in order to utilize the urea bond or the biuret bond.

In case there are used such compounds other than the polyol compounds, the polythiol compounds except 1,2bis-[(2-mercaptoethyl)thio]-3-mercaptopropane and the thiol compounds having a hydroxyl group which react with the isocyanate compound, much attention should be paid to the point of coloring.

Furthermore, as in a known molding process, a variety of additives may be added to the raw materials, if necessary, which are, for example, a chain extender, a crosslinking agent, a light stabilizer, an ultraviolet absorber, an antioxidant, an oil-soluble dye, a filler and so on.

For the purpose of adjusting a reaction rate to a desired level, it is also possible to add a suitable amount of a known reaction catalyst which is usable in the manufacture of S-alkyl.thiocarbamate or polyurethane.

The lenses of the present invention can be obtained by cast polymerization.

Concretely, the alicyclic isocyanate compound represented by the formula (I) and/or the alicyclic isocyanate compound represented by the formula (II) is mixed with at least one active hydrogen compound selected from the group consisting of the polyol compounds, the polythiol.compounds except 1,2-bis[(2-mercaptoethyl)-thio]-3-mercaptopropane, and the thiol compounds having a hydroxyl group. The resulting mixture is then defoamed in a suitable manner, if necessary, and it is poured into a mold. Afterward, polymerization is usually carried out by gradually heating the mixture from a low temperature to a high temperature.

The resin for urethane lenses of the present invention which can be obtained in this way has high refractive index, extremely low dispersion, excellent heat resistance and weathering resistance, is lightweight and has good impact resistance, and therefore it is desirable as a material for optical lenses of spectacles, cameras and the like.

The lenses prepared from the resin material of the present invention can be subjected to a physical or a chemical treatment such as a surface polishing treatment, an antistatic treatment, a hard coat treatment, a non-reflecting treatment, a dyeing treatment or a dimming treatment so as to improve reflection inhibition, abrasion resistance and chemical resistance and to provide high hardness and cloud prevention.

Now, the present invention will be described in more detail in reference to examples and reference examples. For the obtained resins for lenses, performance tests of refractive index, Abbe's number, weathering resistance, heat resistance and appearance were carried out by the following methods.

Refractive index and Abbe's number: Each measurement was made at 20° C. by the use of a Pulfrich refractometer.

Weathering resistance: Each resin for a lens was set on a Weather-O-meter equipped with a sunshine carbon arc lamp, and after 200 hours had passed, the lens was taken out. Afterward, the hue of the lens was compared with that of the resin for the lens prior to the test. Evaluation was made by classifying the change of the hue into no change (O), slight yellowing (Δ) and yellowing (X).

Heat resistance: A heat deformation starting temperature was measured by loading each test piece with a weight of 5 g and then heating the same at 2.5° C./minute by the use of a thermomechanical analyzer (manufactured by Perkin Elmer Co., Ltd. in U.S.A.).

Appearance: Observation was visually made.

EXAMPLE 1

40 g of a mixture of 2,5-bis(isocyanatomethyl)bicyclo-[2.2.1]heptane and 2,6-bis(isocyanatomethyl)bicyclo-[2.2.1]heptane (1:1) was mixed with 42.8 g of tetrakis(2mercaptoethylthiomethyl)methane, and 0.08 g of dibutyltin dilaurate.was then added thereto, followed by forming a uniform mixture. Afterward, the mixture was poured into a mold comprising a glass mold and a gasket, and then heated to cure. The thus obtained resin was colorless and transparent and excellent in weathering resistance, and had a refractive index $n_D$ of 1.62, an Abbe's number $v_D$ of 42 and a heat deformation starting temperature of 120° C.

EXAMPLE 2

47.8 of a mixture of 3,8-bix(isocyanatomethyl)tricyclco[5.2.1.0$^{2.6}$]decane, 3,9-bis(isocyanatomethyl)tricyclo]5.2.1.0$^{2.6}$]decane, 4,8-bis(isocyanatomethyl)tricyclo-[5.2.1.0$^{2.6}$]decane and 4,9-bis(isocyanatomethyl)-tricyclo-[5.2.1.0$^{2.6}$]decane was mixed with 42.8 g of tetrakis(2-mercaptoethylthiomethyl)methane, and 0.09 g of dibutyltin dilaurate was then added thereto, followed by forming a uniform mixture. Afterward, the mixture was poured into a mold comprising a glass mold and a gasket, and then heated to cure. The thus obtained resin was colorless and transparent and excellent in weathering resistance, and had a refractive index $n_D$ of 1.62, an Abbe's number $v_D$ of 41 and a heat deformation starting temperature of 125° C.

EXAMPLES 3 TO 8, COMPARATIVE EXAMPLES 1 TO 2

The same procedure as in Examples 1 and 2 was effected in order to synthesize resins having compositions shown in Table 1. The results of evaluation are set forth in Table 1.

TABLE 1 (I)

|  | Isocyanate Compound (mole of isocyanato group) | Active Hydrogen Compound (mole of active hydrogen group) |
| --- | --- | --- |
| Example 3 | Isocyanate having the same composition as in Example 1 (1.0) | Pentaerythritol tetrakis(3-mercaptopropionate) (1.0) |
| Example 4 | Isocyanate having the same composition as in Example 2 (1.0) | Pentaerythritol tetrakis(3-mercaptopropionate) (1.0) |
| Example 5 | Isocyanate having the same composition as in Example 1 (1.0) | Tetrakis(2-hydroxyethylthiomethyl)methane (1.0) |
| Example 6 | Isocyanate having the same composition as in Example 2 (1.0) | Tetrakis(2-hydroxyethylthiomethyl)methane (1.0) |
| Example 7 | Isocyanate having the same composition as in Example 1 (1.0) | Glycerin 1,3-bis(2-mercaptoacetate) (1.0) |
| Example 8 | Isocyanate having the same composition as in Example 2 (1.0) | Glycerin 1,3-bis(2-mercaptoacetate) (1.0) |

TABLE 1 (II)

| | Isocyanate Compound (mole of isocyanato group) | Active Hydrogen Compound (mole of active hydrogen group) |
|---|---|---|
| Comparative Example 1 | Hexamethylene diisocyanate (1.0) | Pentaerythritol tetrakis(3-mercaptopropionate) (1.0) |
| Comparative Example 2 | Xylylene diisocyanate (1.0) | Pentaerythritol tetrakis(3-mercaptopropionate) (1.0) |

TABLE 1 (III)

| | $n_D$ | $\nu_D$ | Weathering Resistance | Heat Resistance (°C.) | Appearance |
|---|---|---|---|---|---|
| Example 3 | 1.56 | 51 | O | 118 | Colorless & transparent |
| Example 4 | 1.56 | 50 | O | 122 | Colorless & transparent |
| Example 5 | 1.56 | 45 | O | 145 | Colorless & transparent |
| Example 6 | 1.56 | 45 | O | 143 | Colorless & transparent |
| Example 7 | 1.55 | 45 | O | 102 | Colorless & transparent |
| Example 8 | 1.55 | 46 | O | 105 | Colorless & transparent |
| Comparative Example 1 | 1.56 | 44 | O | 61 | Colorless & transparent |
| Comparative Example 2 | 1.59 | 36 | O | 84 | Colorless & transparent |

What is claimed is:

1. A resin for urethane lenses which is obtained by reacting an alicyclic isocyanate compound represented by the formula (I)

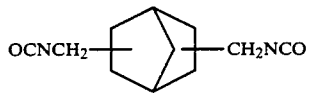
(I)

and/or an alicyclic isocyanate compound represented by the formula (II)

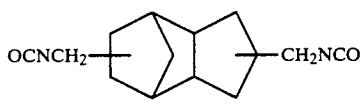
(II)

with at least one active hydrogen compound selected from the consisting of polyol compounds polythiol compounds except 1,2-bis](2-mercaptoethyl)thio]-3-mercaptopropane, and thiol compounds having a hydroxyl group.

2. A resin for urethane lenses according to claim 1 wherein the ratio of the alicyclic isocyanate compound to the active hydrogen compound is such that the molar ratio of functional groups represented by NCO/(SH+OH) is in the range of form 0.5 to 3.0.

3. Lenses comprising a urethane resin which is obtained by reacting an alicyclic isocyanate compound represented by the formula (I)

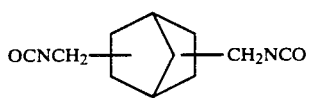
(I)

and/or an alicyclic isocyanate compound represented by the formula (II)

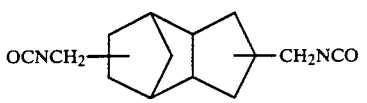
(II)

with at least one active hydrogen compound selected from the consisting of polyol compounds polythiol compounds except 1,2-bis](2-mercaptoethyl)thio]-3-mercaptopropane, and thiol compounds having a hydroxyl group.

4. Lenses according to claim 3 wherein the ratio of the alicyclic isocyanate compound to the active hydrogen compound is such that the molar ratio of functional groups represented by NCO/(SH+OH) is in the range of from 0.5 to 3.0.

5. A process for preparing a resin for urethane lenses which comprises the steps of mixing an alicyclic isocyanate compound represented by the formula (I)

(I)

and/or an alioyclic isocyanate compound represented by the formula (II)

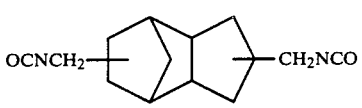
(II)

with at least one active hydrogen compound selected from the group consisting of polyol compounds, polythiol compounds except 1,2-bis[(2-mercaptoethyl)thio]-3-mercaptopropane, and thiol compounds having a hydroxyl group, and then heating a curing the mixture.

6. A process for preparing a resin for urethane lenses according to claim 5 wherein the ratio of the alicyclic isocyanate compound to the active hydrogen compound is such that the molar ratio of functional groups represented by NCO/(SH+OH) is in the range of form 0.5 to 3.0.

7. A process for preparing lenses which comprises the steps of mixign an alicyclic isocyanate compound represented by the formula (I)

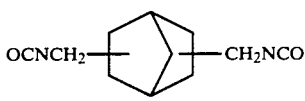
(I)

and/or an alicyclic isocyanate compound represented by the formula (II)

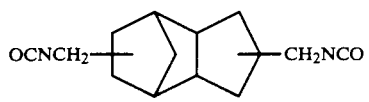 (II)

with at least one active hydrogen compound selected from the group consisting of polyol compounds, polythiol compounds except 1,2-bis](2-mercaptoethyl)thio]-3-mercaptopropane, and thiol compounds having a hydroxyl group, and then cast-polymerizing the mixture.

8. A process for preparing lenses according to claim 7 wherein the ratio of the alicyclic isocyanate compound to the active hydrogen compound is such that the molar rato of functional groups represented by NCO/(SH+OH) is in the range of from 0.5 to 3.0.

* * * * *

UNITED STATES PATENT AND TRADEMARK OFFICE
CERTIFICATE OF CORRECTION

PATENT NO. : 5,059,673

DATED : October 22, 1991

INVENTOR(S) : KANEMURA ET AL.

Page 1 of 2

It is certified that error appears in the above-identified patent and that said Letters Patent is hereby corrected as shown below:

In column 9, line 51, before "consisting" insert --group--; and after "compounds" insert --,--; and In column 9, line 59, amend "form" to --from--.

In column 10, line 22, before "consisting" insert --group--; and after "compounds" insert --,--;

In column 10, line 23, amend "](2-mercaptoethyl)" to --[(2-mercaptoethyl)--;

In column 10, line 40, amend "alioyclic" to --alicyclic--;

In column 10, line 53, amend "a" to --and--;

In column 10, line 58, amend "form" to --from--; and

In column 10, line 61, amend "mixign" to --mixing--.

UNITED STATES PATENT AND TRADEMARK OFFICE
CERTIFICATE OF CORRECTION

PATENT NO. : 5,059,673

DATED : October 22, 1991

INVENTOR(S) : Kanemura, et al

It is certified that error appears in the above-identified patent and that said Letters Patent is hereby corrected as shown below:

In Column 12, line 1, amend "](2-mercaptoethyl)" to --[(2-mercaptoethyl)--

Signed and Sealed this

Twenty-seventh Day of April, 1993

*Attest:*

MICHAEL K. KIRK

*Attesting Officer*      *Acting Commissioner of Patents and Trademarks*